(No Model.)
J. DONOVAN.
CAR WHEEL.
No. 539,612. Patented May 21, 1895.
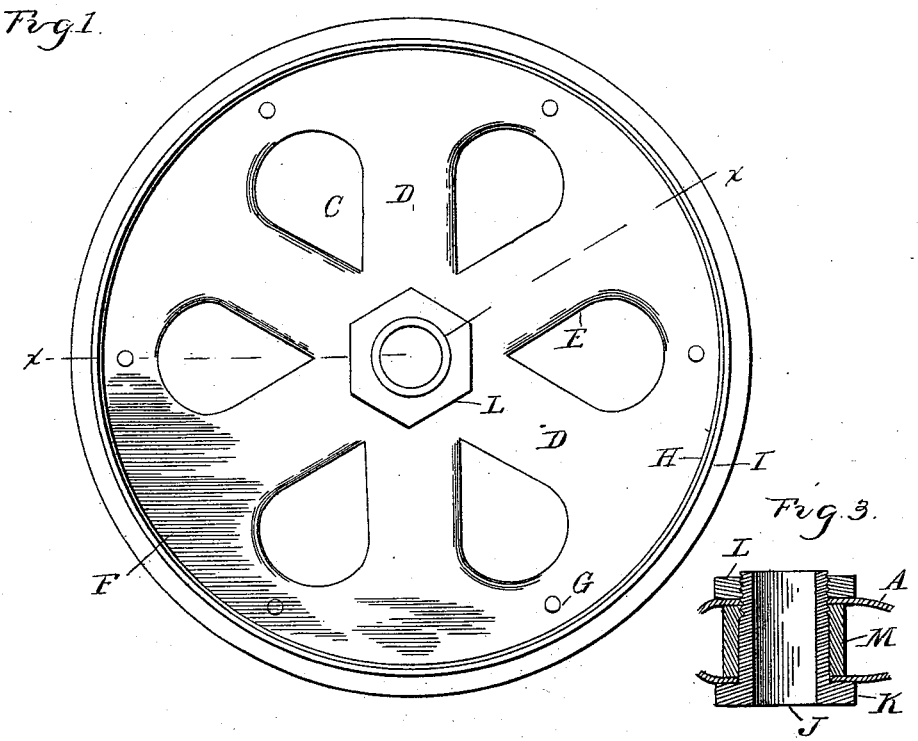
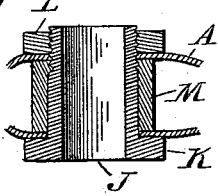
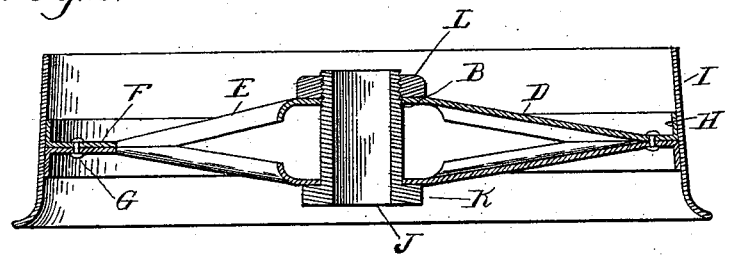
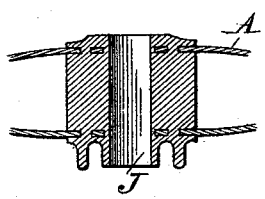
Witnesses
L. J. Whittemore
A. L. Stabby
Inventor
James Donovan
By Thos. S. Sprague
Attys.

UNITED STATES PATENT OFFICE.

JAMES DONOVAN, OF THREE RIVERS, MICHIGAN, ASSIGNOR TO THE ROBERTS, THROP & COMPANY, OF SAME PLACE.

CAR-WHEEL.

SPECIFICATION forming part of Letters Patent No. 539,612, dated May 21, 1895.

Application filed May 21, 1894. Serial No. 511,943. (No model.)

*To all whom it may concern:*

Be it known that I, JAMES DONOVAN, a citizen of the United States, residing at Three Rivers, in the county of St. Joseph and State of Michigan, have invented certain new and useful Improvements in Car-Wheels, of which the following is a specification, reference being had therein to the accompanying drawings.

The invention consists in the peculiar construction of a wheel comprising a body of two steel metal disks, separated at the hub, inclined toward each other and secured together at the rim, and a rim secured to the body; further in the construction of the hub, and in the construction of the means of connecting the rim to the body, all as more fully hereinafter described.

In the drawings, Figure 1 is a side elevation of my improved wheel. Fig. 2 is a cross-section thereof on line $x\ x$. Fig. 3 is a section through the hub, showing a modification; and Fig. 4 is a similar section showing another modification.

A are two like disks of sheet metal, having a central aperture B and the radial apertures C forming between the apertures C, the spokes D. The edges E are turned in to form stiffening flanges for the spokes. The disks are dished so that when two such disks are arranged together, the hub sections will be separated, while the outer ring shaped sections F will contact and may be secured together in any desired manner as by rivets G near the edge. The edges of the disks are formed with the outwardly turned flanges H, forming a wide bearing on which the rim I may be secured in any desired manner.

The hub I preferably form as shown in Fig. 2, where I have shown a tubular nipple J, having a flange K at one end and screw threaded at the other end to receive the nut L, by means of which the disks may be clamped together upon the hub. The rim may be shrunk on, riveted on or secured in any other manner. The clamping of the hub sections of the disks together forces the flanges H against the rim and aids in producing a rigid, solid wheel.

I may use a sleeve M between the hub sections of the disks, as shown in Fig. 3, or I may make the hub by casting it upon the disks, as shown in Fig. 4.

What I claim as my invention is—

1. A wheel combining two oppositely inclined disks, centrally apertured, radial spokes formed in the disks by a series of apertures, the edges of the spokes being bent in, means for securing the outer edges of the disks together, oppositely turned flanges on the outer edges of the disks, a rim secured upon the face of said flanges, and a nipple passed through the central apertures in the disks, substantially as described.

2. A wheel combining two oppositely inclined disks, centrally apertured, radial spokes formed in the disks by a series of apertures, the edges of the spokes being bent in, means for securing the outer edges of the disks together oppositely turned flanges on the outer edges of the disks, a rim secured upon the face of said flanges, a nipple passed through the central apertures in the disks, a flange at one end and a nut engaging a screw threaded bearing on the other end for clamping the disks between, substantially as described.

In testimony whereof I affix my signature in presence of two witnesses.

JAMES DONOVAN.

Witnesses:
JAMES B. ROBERTS,
GEORGE A. ROBERTS.